United States Patent [19]
Kaufman

[11] Patent Number: 6,080,805
[45] Date of Patent: Jun. 27, 2000

[54] POLYMER MODIFYING AGENT

[75] Inventor: Harvey Lewis Kaufman, Hudson, Ohio

[73] Assignee: Polymer Process Technologies, Inc., Stow, Ohio

[21] Appl. No.: 09/184,377

[22] Filed: Nov. 2, 1998

[51] Int. Cl.[7] .............................. B01J 29/06; B01J 31/00
[52] U.S. Cl. ............................... 524/47; 205/699; 502/64; 502/70; 502/159; 502/404; 502/410; 502/414
[58] Field of Search ............................... 524/47; 205/699; 502/64, 70, 159, 404, 410, 414

[56] References Cited

U.S. PATENT DOCUMENTS

| | | | |
|---|---|---|---|
| 4,348,492 | 9/1982 | Shasha et al. | 524/52 |
| 4,983,651 | 1/1991 | Griffin | 524/47 |
| 5,303,661 | 4/1994 | Yu et al. | 110/341 |
| 5,650,454 | 7/1997 | Hoover et al. | 524/47 |
| 5,710,200 | 1/1998 | Toratani et al. | 524/191 |
| 5,731,358 | 3/1998 | Pillai | 521/41 |

*Primary Examiner*—Nathan M. Nutter
*Attorney, Agent, or Firm*—Emerson & Associates; Roger D. Emerson; Daniel A. Thomson

[57] ABSTRACT

A polymer modifying agent for use in increasing the shelf life of natural rubber. The polymer modifying agent consists of a zeolite, a high molecular weight fatty acid, a starch, a catalyst, and rubber processing oil and aliphatic resin. The compound bonds with the rubber, particularly the polymer chains of the rubber being encapsulated by the zeolite, preventing the aging effect caused by oxidation and light. The compound also acts to disperse the silica evenly throughout the rubber. The inventive compound is also composed of components that are non-toxic. A method of blocking the effects of premature curing of rubber is also provided. The method includes a step of adding the inventive compound to the rubber.

28 Claims, No Drawings

POLYMER MODIFYING AGENT

BACKGROUND OF THE INVENTION

I. Field of the Invention

This invention pertains to the art of polymers, and more particularly, to polymer modifying agents for use in increasing the shelf life of rubber compounds.

II. Description of the Related Art

The short shelf life of uncured rubber has been a problem in the industry for quite some time. Oxygen and light activate the sulfur cure system and the accelerators in the rubber, causing premature curing, completely destroying the rubber. Different additives have been added to the virgin rubber to modify the properties of the rubber.

Mixing additives with virgin rubber is well known in the art. One known type is described in U.S. Pat. No. 5,650,454 to Hoover et al. Hoover et al disclose a rubber additive which increases tear resistance when added to a rubber compound. This compound comprises a cross-linked fatty acid, starch, and an asphalt carrier. One drawback of the Hoover patent is that the asphalt-based processes give a lower yield than the present invention, and the individual compounds are more toxic. A problem that is not addressed by the Hoover patent is the long-term storage of the tires. The current invention allows for an increased shelf life of the rubber. Another drawback of the Hoover patent is the length of time needed to process the compound.

Another known type of rubber additive is disclosed in U.S. Pat. No. 5,710,200 to Toratani et al. Toratani et al disclose natural rubber, containing viscosity stabilizers, treated with a strainer after compounding hydrazide stearate into the natural rubber. Storage hardening is purportedly suppressed and a decrease in molecular weight is prevented. One drawback of the Toratani patent is the toxicity of the hydrazide compound.

The present invention contemplates a new polymer-modifying agent for use in increasing the shelf life of uncured rubber, and for dispersing silica in the rubber compound. Thus, this invention is simple in design, effective in use, and overcomes the foregoing difficulties and others while providing better and more advantageous overall results.

SUMMARY OF THE INVENTION

In accordance with one aspect of the present invention a new and improved polymer-modifying agent includes a zeolite, a catalyst, and a starch. The zeolite, catalyst and starch are blended together with a high-speed blender.

In accordance with another aspect of the present invention the polymer- modifying agent also includes a lubricant, and dispersing means for dispersing silica and carbon black. The lubricant is a high molecular weight fatty acid, preferably stearic acid. The dispersing means is a combination of an aliphatic hydrocarbon resin and a rubber processing oil.

In accordance with yet another aspect of the invention the compound comprises 32–42% by weight of the zeolite, 0.5–7% by weight of lubricant, 3–13% by weight of the starch, 2–12% by weight of the catalyst, 15–35% by weight of the aliphatic hydrocarbon resin, and 6–21% by weight of the rubber processing oil.

One advantage of the present invention is the improved tear strength of the rubber.

Another advantage of the current invention is the increased shelf life of the rubber.

A further advantage of the current invention is that the compounds used are non-toxic.

Still another advantage of the current invention is the increased dispersion of the mineral fillers, and the stabilization of scorch and cure rates.

Yet another advantage of the current invention is that the compound is a simple mechanical blend, that is consistent in its production.

Still other benefits and advantages of the invention will become apparent to those skilled in the art upon a reading and understanding of the following detailed specification.

DESCRIPTION OF THE PREFERRED EMBODIMENT

It has been seen throughout the development of chemicals for the rubber and plastic industry that certain compounds can help in the production or processing of the rubbers and plastics. Use of such compounds as stearic acid, and other high molecular-weight fatty acids, aid in dispersion of filler materials, such as carbon black, in the compound and in the time element involved in the milling of these elastomers. The chemicals used as process improvement modifiers are usually organic chemicals, very few, if any, being organo-metallic in nature. The current invention uses an inclusion process aid, and for the first time a compound can truly extend the shelf life of a rubber compound by a minimum of one month or longer.

In the preferred embodiment, the modifying agent comprises a zeolite-based material. The zeolite, which has a morphology of cavities, incorporates the starch, high molecular weight fatty acid, the catalyst, the processing oil, and the aliphatic resin. The preferred zeolite is a magnesium-alumino silicate, but any anionic zeolite, including sodium-magnesium-alumino silicate, calcium-alumino silicate, and calcium-magnesium-alumino silicate, may be used. The zeolite acts as a molecular sieve, trapping smaller compounds in the geometric spaces created by the structure of the zeolite. The zeolite has large enough spaces that the polymer chains in the rubber compound can fit inside the zeolite. In the preferred embodiment, the zeolite also incorporates the starch, processing oil, fatty acid, and resin, in order to create the inventive compound.

Any kind of starch maybe used, however, cornstarch is preferred because it is relatively inexpensive. The starch helps improve tear strength of the rubber.

The preferred high molecular weight fatty acid is stearic acid, again due to its relative cost. The fatty acid works as a lubricant and a dispersive aid in the rubber. The invention would work without the use of a fatty acid; however, the preferred embodiment includes this fatty acid. The fatty acid helps to disperse the inventive compound throughout the rubber.

Calcium chloride may be used as a catalyst to begin the reaction; however, any Lewis acid would work as a catalyst in this reaction. Calcium chloride is chosen for the preferred embodiment because it is relatively inexpensive.

Any rubber processing oil known in the art, and any aliphatic hydrocarbon resin known in the art, may be used. However, in the preferred embodiment, the processing oil used is the Sunthene™ series by SunOil™. The aliphatic hydrocarbon resin used in the preferred embodiment is terpene resin.

EXAMPLE 1
Natural Rubber/Sbr Samples

Compound: Natural Rubber/SBR (Proprietary) 3% of New Invention

| Week# | Scorch Time($T_s2$) | Cure Time($T_c(90)$) | Shore A |
|---|---|---|---|
| Control | 4.22 | 6.47 | 45.67 |
| 1 | 3.95 | 6.25 | 47.25 |
| 2 | 3.88 | 6.10 | 43.33 |
| 3 | 3.73 | 5.95 | 42.00 |
| 55 | 3.97 | 6.20 | 45.00 |

The inventive compound creates stereohindrance of oxidation and light. The compound is so large that it ties up the polymer chains in the rubber. The polymer chains in the rubber are encapsulated in the zeolite, which in effect blocks any light or air from coming in contact with the rubber. In the preferred embodiment, the inventive compound is added at 2–5 parts per hundred with the rubber. There is no significant measurable difference between the ranges of 2–5 parts per hundred of the inventive compound. However, anything in excess of 5 parts per hundred of the inventive compound begins a regression to a softer rubber. The compound is added as the rubber is being milled, and the talc or calcium carbonate filler and carbon black are being added. Alternatively, the compound can be added when the pigments are added.

As seen in Example 1, a proprietary natural rubber/SBR (styrene-butadiene rubber) compound showed excellent data on the effect on scorch time, cure time, and Shore A hardness. [The scorch time is defined as the initiation time for the rubber curing process, and the cure time is defined as the end time, when the rubber has been completely cured. The Shore A hardness is measured on a Shore durometer, and is a scale from 0–100 (0 being the softest, 100 being the hardest) determining the hardness of the rubber.] The natural rubber/SBR compound was tested without the inventive compound and EXAMPLE 1 shows the results of that test. In another sample, the inventive compound was then added at 3% by weight and tested after the first week, EXAMPLE 1 again showing the data for that. The compound was then successively tested on week 2 and week 3, EXAMPLE 1 showing the data for those particular tests. EXAMPLE 1 shows no measurable effect on scorch time, cure time, or Shore A hardness. The compound was also tested after a 55-week storage period, again showing little measurable effect on the scorch or cure times.

EXAMPLE II
Natural Rubber Eraser Samples

Compound: Proprietary Natural Rubber Erasure Compound, 3% of Invention Compound Added

| Week# | Scorch Time($T_s2$) | Cure Time($T_c(90)$) | Shore A |
|---|---|---|---|
| Control | 1.28 | 2.30 | 45.33 |
| 1 | 1.27 | 2.13 | 43.33 |

A proprietary natural rubber eraser compound, which is extremely sensitive to air and light pre-cure, was tested as a control and the data for that test is shown in EXAMPLE 2. In another sample, 3% by weight of the inventive compound was then added to the proprietary natural rubber eraser compound and the compound was tested after one week, EXAMPLE 2 showing little measurable effect on scorch time, cure time, or Shore A hardness. The proprietary natural rubber eraser compound usually pre- cures in air within one to two days. However, with the inventive compound added, after one week of storage no measurable difference on scorch or cure time was shown.

EXAMPLE III
Highly Loaded Silica/Rubbber Samples

Compound: Proprietary Automotive Compound Using D-706 SBR and Budene 1207. Compound Highly Loaded with Silica. Special Testing to Show No Changes on Same Processing, Control and Control + 3% of Invention Added.

| Compound | 100% MOD | Rebound | Compression Set % | Silica Incorp |
|---|---|---|---|---|
| Control | 780 | 26.6 | 22.5 | 2 |
| Control + 3% Invention added | 864 | 27.5 | 22.4 | 1 |

The inventive compound also acts as a good silica dispersion aid in highly loaded compounds. Most tires are composed of a significant percentage of silica (up to 70% by weight) as a filler in the rubber, because the supply of virgin rubber is limited. However, this silica is not uniformly distributed throughout the rubber. The silica can build up static electricity, which, in large enough quantities, can be dangerous. The processing oil and aliphatic resin act as dispersing agents in the rubber compound. The oil and resin are able to disperse the silica in a highly loaded compound. The oil and resin ensure that the silica is evenly distributed throughout the rubber. This even distribution of silica creates a more even wear on the rubber, which in turn allows for a longer life for the rubber.

EXAMPLE 3 shows that a highly loaded silica compound shows no change in physicals. Highly loaded silica compound is defined as 30–70% silica by weight. A first sample of a proprietary automotive compound highly loaded with silica, was tested and EXAMPLE 3 shows the results of that data. In another sample, 3% by weight of the inventive compound was then added and no measurable difference was shown in the 100% modulus, rebound percentage, or a compression percentage. [The modulus is defined as the stiffness of the rubber, the rebound is defined as the percentage that the rubber rebounds back to its original form after stretching, the compression set is defined as the percentage that the rubber returns to its original shape after being compressed, and the silica incorporation is defined as the percentage at which the silica is dispersed throughout the rubber.] These results also show the strong potential of the inventive compound as a good silica dispersion aid in highly loaded compounds.

EXAMPLE IV
Compound Preparation

The inventive compound is created by a mixture of the following powders: a zeolite, a catalyst, a fatty acid, a starch, a rubber processing oil, and a resin. The powders are charged in a Henshel blender. The powders are blended at 25000 rpm for 5–10 minutes. The temperature created in the blender is between 130–140° F. This temperature activates the catalyst, which provides the reaction creating the inventive compound. In the preferred embodiment the compound comprises 37% by weight of zeolite, 2% by weight of stearic acid, 8% by weight of corn starch, 7% by weight of calcium chloride, 30% by weight of the aliphatic resin, and 16% by weight of the processing oil. The zeolite can range between 32–42% by weight, the stearic acid 0.5–7% by weight, the corn starch 3–13% by weight, the calcium chloride 2–12% by weight, the resin 15–35% by weight and the oil 6–21% by weight. The average rubber additive for the elastomer industry has to undergo a chemical reaction between two or more raw materials under reaction kettle conditions in production. Many parameters such as temperature, pre-cure, and mix rate are necessarily controlled. It is found that these reaction products are costly and vary from production to production. The inventive compound is a high-speed physical blend which, by the shear and torque of the Henshel blender, is chelated together and production of the compound is constant from batch to batch. The compound will work without the stearic acid, the resin, or the oil, but the compound will not have the dispersive effect that it has with these compounds added.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. An organo-metallic compound for use as a polymer modifying agent, the compound comprising:
   a) a zeolite;
   b) a catalyst; and,
   c) a starch.

2. The organo-metallic compound of claim 1, wherein the zeolite is a magnesium-alumino silicate.

3. The organo-metallic compound of claim 1, wherein the catalyst is a Lewis acid.

4. The organo-metallic compound of claim 3, wherein the Lewis acid is calcium chloride.

5. The organo-metallic compound of claim 1, wherein the starch is cornstarch.

6. The organo-metallic compound of claim 1 further comprising:
   a) a lubricant; and,
   b) dispersing means for dispersing fillers.

7. The organo-metallic compound of claim 6, wherein the lubricant is a high molecular weight fatty acid.

8. The organo-metallic compound of claim 7, wherein the high molecular weight fatty acid is stearic acid.

9. The organo-metallic compound of claim 6, wherein the dispersing means are rubber processing oil and an aliphatic hydrocarbon resin.

10. The organo-metallic compound of claim 9 comprising:
    a) 32–42% by weight of the zeolite;
    b) 0.5–7% by weight of the lubricant;
    c) 3–13% by weight of the starch;
    d) 2–12% by weight of the catalyst;
    e) 15–35% by weight of the aliphatic hydrocarbon resin; and,
    f) 6–21 % by weight of the rubber processing oil.

11. An organo-metallic compound for use as a polymer modifying agent, the compound comprising:
    a) 37% by weight of magnesium-alumino silicate;
    b) 2% by weight of stearic acid;
    c) 8% by weight of cornstarch;
    d) 7% by weight of calcium chloride;
    e) 16% by weight of rubber processing oil; and,
    f) 30% by weight of terpene resin.

12. A method for blocking the effects of premature curing of rubber by air and light, the method comprising the steps of:
    a) adding an organo-metallic compound to rubber, the organo-metallic compound comprising:
       1) a zeolite;
       2) a starch; and,
       3) a catalyst.

13. The method of claim 12, wherein the compound is added at 2–5 parts per hundred.

14. The method of claim 12, wherein the compound further comprises:
    a) a lubricant; and,
    b) dispersing means for dispersing fillers.

15. The method of claim 12, wherein the zeolite is a magnesium-alumino silicate.

16. The method of claim 12, wherein the starch is cornstarch.

17. The method of claim 12, wherein the catalyst is calcium chloride.

18. The method of claim 14, wherein the lubricant is a high molecular weight fatty acid.

19. The method of claim 18, wherein the high molecular weight fatty acid is stearic acid.

20. The method of claim 14, wherein the dispersing means are a rubber processing oil and an aliphatic hydrocarbon resin.

21. The method of claim 20, wherein the compound comprises:
    a) 37% by weight of the zeolite;
    b) 2% by weight of the lubricant;
    c) 8% by weight of the starch;
    d) 7% by weight of the catalyst;
    e) 30% by weight of the aliphatic resin; and,
    f) 16% by weight of the rubber processing oil.

22. A rubber compound comprising:
    a) rubber selected from the group consisting of natural rubbers, synthetic rubbers, and mixtures of any of the foregoing;
    b) a zeolite;
    c) a starch; and,
    d) a catalyst.

23. The rubber compound of claim 22, wherein the zeolite is a magnesium-alumino silicate.

24. The rubber compound of claim 22, wherein the starch is cornstarch, and the catalyst is calcium chloride.

25. The rubber compound of claim 22, the compound further comprising:
    a) a lubricant; and,
    b) dispersing means for dispersing fillers.

26. The rubber compound of claim 25, wherein the lubricant is a high molecular weight fatty acid.

27. The rubber compound of claim 26, wherein the high molecular weight fatty acid is stearic acid.

28. The rubber compound of claim 25, wherein the dispersing means are a rubber processing oil and an aliphatic resin.

* * * * *